US010605541B1

United States Patent
Zheng et al.

(10) Patent No.: US 10,605,541 B1
(45) Date of Patent: Mar. 31, 2020

(54) HEAT PIPE—THERMAL STORAGE MEDIUM BASED COOL STORAGE SYSTEM

(71) Applicant: Advanced Cooling Technologies, Inc., Lancaster, PA (US)

(72) Inventors: Ying Zheng, Lancaster, PA (US); Chien-Hua Chen, Lititz, PA (US); Howard Pearlman, Haddon Township, NJ (US); Richard Bonner, III, Lancaster, PA (US); William G. Anderson, Bound Brook, NJ (US)

(73) Assignee: ADVANCED COOLING TECHNOLOGIES, INC., Lancaster, PA (US)

( * ) Notice: Subject to any disclaimer, the term of this patent is extended or adjusted under 35 U.S.C. 154(b) by 308 days.

(21) Appl. No.: 15/270,083

(22) Filed: Sep. 20, 2016

(51) Int. Cl.
*F28D 20/00* (2006.01)
*F28D 15/06* (2006.01)
*F28D 15/02* (2006.01)
*F28D 20/02* (2006.01)
*F28D 15/04* (2006.01)
*F28D 21/00* (2006.01)

(52) U.S. Cl.
CPC .......... *F28D 20/00* (2013.01); *F28D 15/025* (2013.01); *F28D 15/04* (2013.01); *F28D 15/06* (2013.01); *F28D 20/003* (2013.01); *F28D 20/0034* (2013.01); *F28D 20/0056* (2013.01); *F28D 20/021* (2013.01); *F28D 2020/0078* (2013.01); *F28D 2021/0063* (2013.01)

(58) Field of Classification Search
CPC ........ F28D 15/025; F28D 15/04; F28D 15/06; F28D 15/0258; F28D 20/00; F28D 20/003; F28D 20/0034; F28D 20/0056; F28D 2020/0078; F28D 2020/0063
USPC ........................................ 165/104.26, 104.33
See application file for complete search history.

(56) References Cited

U.S. PATENT DOCUMENTS

| | | | | |
|---|---|---|---|---|
| 2,875,263 A | * | 2/1959 | Narbutovskih | ..... F28D 15/0266 165/104.25 |
| 3,489,203 A | * | 1/1970 | Fischell | ................. B64G 1/506 165/104.26 |

(Continued)

FOREIGN PATENT DOCUMENTS

JP 5217593 B2 * 6/2013

*Primary Examiner* — Devon Russell
(74) *Attorney, Agent, or Firm* — McNees Wallace & Nurick LLC (57) ABSTRACT

A cool storage system comprising which includes a plurality of heat pipes. Each of the heat pipes has a lower evaporator section, a hybrid evaporator/condensing section, and an upper condensing section. The hybrid evaporator/condensing section positioned between the lower evaporator section and the upper condensing section. Each of the heat pipes contains a selected amount of a heat transfer fluid adapted to transfer heat from the lower evaporator section to the hybrid evaporator/condensing section and the upper condensing section through a vapor/condensation cycle, or the heat transfer fluid is vaporized in the hybrid evaporator and condensed in the upper evaporator section. A thermal storage medium is provided in thermal engagement with the hybrid evaporator/condensing section. A heat source is located in said lower evaporator section, and a cooling source, located in said upper condensing section.

27 Claims, 6 Drawing Sheets

(56) References Cited

U.S. PATENT DOCUMENTS

| | | | | |
|---|---|---|---|---|
| 3,602,429 | A | * | 8/1971 | Levedahl ............... B60H 1/025 165/104.26 |
| 4,131,158 | A | * | 12/1978 | Abhat .................... C09K 5/063 126/400 |
| 4,941,526 | A | * | 7/1990 | Nilsson .................. F28D 15/06 165/274 |
| 4,974,667 | A | * | 12/1990 | Sun ........................ B60H 1/025 165/274 |
| 5,771,967 | A | * | 6/1998 | Hyman ................... B64G 1/50 126/45 |
| 6,220,337 | B1 | * | 4/2001 | Chen .................. F28D 15/0266 165/10 |
| 6,631,755 | B1 | * | 10/2003 | Kung ...................... F28D 15/02 165/104.14 |
| 6,997,241 | B2 | | 2/2006 | Chou et al. |
| 7,845,167 | B2 | | 12/2010 | Miyagawa et al. |
| 8,201,615 | B2 | * | 6/2012 | Soukhojak ............. C09K 5/063 165/10 |
| 8,839,613 | B2 | | 9/2014 | Levin et al. |
| 8,863,740 | B2 | * | 10/2014 | Williamson ............ F24S 40/50 126/643 |
| 9,939,141 | B2 | * | 4/2018 | Surdeanu ............... F21V 29/00 |
| 2012/0227926 | A1 | | 9/2012 | Field et al. |
| 2013/0333238 | A1 | | 12/2013 | Thiyagarajan |
| 2014/0008033 | A1 | | 1/2014 | Howes et al. |
| 2014/0284020 | A1 | * | 9/2014 | Amir ...................... F28D 15/02 165/10 |
| 2015/0369542 | A1 | | 12/2015 | Minvielle et al. |
| 2016/0174418 | A1 | | 6/2016 | He et al. |

\* cited by examiner

HEAT PIPE—THERMAL STORAGE MEDIUM BASED COOL STORAGE SYSTEM

FIELD OF THE INVENTION

The invention is directed to a cool storage system utilizing dry cooling. In particular, the invention is directed to a heat pipe-thermal storage medium based cool storage system which can augment air cooled condensers for baseload cooling requirements.

BACKGROUND

More than 86% of electricity in the U.S. is produced in thermoelectric power generating plants, most of which use coal, natural gas, or nuclear power to generate thermal energy. The thermal energy drives steam turbines to produce electrical power, and typically more than 60% of the original energy is wasted and carried away as low-grade heat. Operators must remove this heat, and 99% of baseload thermoelectric plants in the U.S. use water-cooled systems, or wet cooling, to do so. As a result, wet-cooling systems at power plants currently account for 41% of all fresh water withdrawals in the U.S.

Since availability of fresh water resources is increasingly strained by drought and growing demand, and potential climate change impacts add uncertainty to the quality and quantity of future water supplies, dry-cooling systems (air cooled condensing) have therefore received increased attention. In these systems, however, the air temperature tends to be warmer than the fresh water temperature, and air has a substantially smaller cooling capacity compared with that of water. As a result, current dry-cooling technologies are less effective in cooling the steam in power plants, thus resulting in a reduction in the efficiency of power generation compared with that for water cooled generators. Specifically, during hot ambient temperatures, the efficiency of an air cooled condenser is even lower because of the temperature difference between the air and the steam is low. As a result, power plants are overdesigned with respect to air cooled condenser cooling capacity, so they can handle the highest ambient temperatures. This dramatically increases the capital cost of dry cooling systems.

To enhance the thermal efficiency of dry cooling systems, research and development has focused on heat transfer enhancement techniques for air cooled condensers. There are a wide variety of strategies, and generally can be classified in two broad categories: improvement of air-side heat transfer and enhancement of steam-side heat transfer.

The general concept of the improvement of air-side heat transfer is to modify the existing structure of air-side fins or create a new mechanical structure to have a better interaction with the feeding air, thus a higher heat transfer coefficient for the air-side convection. Conventional enhancement techniques, such as multi-louvered, ribbed and the slit-fin transport enhancement technique, operate by frequently disrupting and restarting the boundary layers, yielding a high heat transfer coefficient. While these approaches can reduce air-side thermal resistance, the resulting pressure drop increase negates the net plant performance gain. Recently, enhancement of heat transfer through increasing the air fluid mixing has also received increased attention, such as fluid-structure interaction using oscillating reeds, a piezo-actuated structure inserted into air-flow channels. The motion of the reeds generates vortical flow structures and increases fluid mixing. Such mechanical mixing techniques are still in their infancy for dry cooling applications.

In principle, there are a few ways to enhance steam-side or condensation heat transfer. One way is to increase the area of the condensing surface, and another is to reduce the thermal resistance due to the condensate film formed on the surface. In practice, a combination of these two methods is employed simultaneously to develop high-performance condenser surfaces. Copper metal with a hydrophobic coating has experimentally been shown to have a very high heat transfer coefficient (nearly five times higher than for an untreated surface), however, further studies need to demonstrate the thermal performance for steel surfaces including those used in power plants, as well as its reliability in long-term service life.

Although the methods of enhancing thermal efficiency of dry cooling systems provide some increase in efficiency, it would be beneficial to provide dry cooling with a cool storage system to provide enhanced efficiency.

SUMMARY

An object of the invention is to provide a supplemental cool storage system that can augment air cooled condensers for baseload cooling requirements.

An object of the invention is to provide a heat pipe-thermal storage medium-based supplemental cool storage system, used to store the cold energy at night and use it to cool the incoming warm fluid (steam or condensation water) during temperature excursions during daytime.

An object of the invention is to provide a supplemental cool storage system which accommodates additional cooling requirements at high ambient temperatures, so that the number of air cooled condenser cells needed for cooling can be significantly reduced.

An object of the invention is to provide a supplemental cool storage system in which heat pipes help spread the heat load and fins provide for additional heat transfer area. The excess heat from a power plant can be efficiently transferred to the cool storage media and then dissipated to a cooler ambient at night. The amount of required structure and fan power for heat transport can be minimized and the system can be cost-effective.

An embodiment is directed to a cool storage system comprising which includes a plurality of heat pipes. Each of the heat pipes has a lower evaporator section, a hybrid evaporator/condensing section, and an upper condensing section. The hybrid evaporator/condensing section is positioned between the lower evaporator section and the upper condensing section. Each of the heat pipes contains a selected amount of a heat transfer fluid adapted to transfer heat from the lower evaporator section to the hybrid evaporator/condensing section and the upper condensing section through a vapor/condensation cycle, or the heat transfer fluid is vaporized in the hybrid evaporator and condensed in the upper evaporator section. A thermal storage medium is provided in thermal engagement with the hybrid evaporator/condensing section. A heat source is located in said lower evaporator section, and a cooling source, located in said upper condensing section.

Fins may be provided on an outside surface of the hybrid evaporator/condensing section and extended into the thermal storage medium. The thermal storage medium and fins may be enclosed in chambers. Fins may also be provided on an outside surface of the lower evaporator section and the upper condensing section.

The thermal storage medium may be: a single-phase material, such as solid metal, sand, liquid water or compressed gas, which acts as a sensible heat storage medium;

a phase-change material, such as liquid-solid organics including paraffin and non-paraffin based phase-change materials, liquid-solid inorganics including salt hydrates and metallic, liquid-solid eutectics including mixtures of organic and inorganics; or a chemically reactive material, such as adsorbent, which releases heat during adhesion of a substance to its surface, and stores heat in the reverse process.

The thermal storage medium may be a single material, or a mixture of different thermal storage materials. This includes but not limited to an embodiment in which a set of phase change materials is provided with decreasing melting points adjacent respectively to each of the heat pipes along the flow path of hot heat transfer fluid. The set of phase change materials maintains a similar temperature drive between each of the thermal storage medium and the heat source between each heat pipe-thermal storage medium module during utilization mode.

In various embodiments, at least a portion of the thermal storage medium is enclosed in chambers. The chambers may be hermetically sealed.

The hybrid evaporator/condensing section of at least one of the heat pipes may have overcharged liquid which extends above the lower evaporator section. Alternatively, the hybrid evaporator/condensing section of at least one of the heat pipes may have: internal pockets; drainers in the internal pockets; orifices in the internal pockets, screens, or a combination thereof to retain liquid in the hybrid evaporator/condensing section.

The heat source located in the lower evaporator section may be a hot gas or a hot liquid or a hot solid or a combination thereof (such as, but not limited to, a liquid-gas mixture). The cooling source located in the upper condensing section may be a gas or a liquid or a solid or a combination thereof (such as, but not limited to, a liquid-solid mixture).

The heat pipes may have a tilt angle for the lower evaporator section and/or the hybrid evaporator/condensing section, and/or the upper condensing section.

One or more of the heat pipes may have a valve. The valves are located internally between the lower evaporator sections and the hybrid evaporator/condensing sections. The valves open when the heat source in the lower evaporator section is warmer than desired, allowing the excess energy from the heat source to be transferred by the heat pipes to the storage medium, and to the upper condensation section when the cooling source in the upper condensing section is cooler than vapor in said heat pipes. The valves close when the heat source in the lower evaporator section is not warmer than desired.

A path between the lower evaporator sections and hybrid evaporator/condensing sections may be partially sealed or completely sealed when the valves are closed. The valves may be passive valves, which close and open in response to the temperature of the heat source. Alternatively, the valves may be active valves, such as electrically operated valves.

At least one of the heat pipes may be a thermosyphon. During operation, a liquid pool height in the heat pipes may extend into the hybrid evaporator/condensing section which is adjacent to the thermal storage, to allow the thermosyphon to operate when the lower evaporator is not operating.

A bypass loop may be provided to allow the heat source to partially or fully bypass the plurality of heat pipes during a regeneration of the thermal storage medium.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

In general, the invention is directed to a cool storage system 10 that uses heat pipes 12 to efficiently transfer heat into a thermal storage system or medium 14 containing a phase change material or other medium, in addition to the ambient, when the ambient temperature is high and rejects the stored heat when the ambient temperature is low.

In one illustrative embodiment, a heat pipe 12 consists of a sealed container 16 with a small amount of working fluid 18 which is in equilibrium to its vapor and wick structures. There a different variants of heat pipes 12. One common type is a heat pipe 12 without a wick structure. In this case, the condensed vapor is circulated back to the evaporator by gravity and the heat pipe 12 is often called a thermosyphon. Thermosyphons may also have a wick in the evaporator section 22, to aid in startup.

Figure 1:
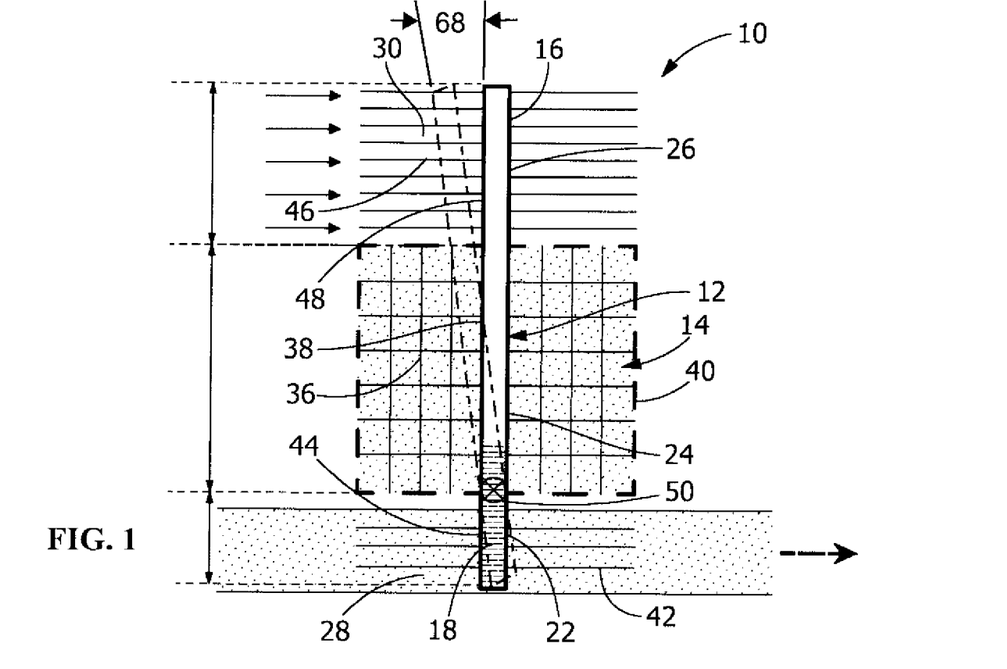
FIG. 1 is a schematic view of the heat pipe-thermal storage medium based cool storage system of the present invention.

Referring to FIG. 1, the cool storage system 10 includes: one or more heat pipes 12, a thermal storage medium 14, a heat source/first heat transfer media 28 and a cooling source/second heat transfer media 30. Each of the heat pipes 12 has a lower evaporator section 22, a midway hybrid evaporator/condensing section 24, and an upper condensing section 26. Each of the heat pipes 12 containing a selected amount of a working or heat transfer fluid 18 adapted to transfer heat from the lower evaporator section 22 to the hybrid evaporator/condensing section 24 and the upper condensing section 26 through a vapor/condensation cycle. Alternatively, the heat transfer fluid 18 is vaporized in the midway hybrid evaporator 24 and condensed in the upper condensing section 26, as will be more fully described. The thermal storage medium 14 is in thermal engagement with the midway hybrid evaporator/condensing section 24. The heat source/first heat transfer media 28 is located around the lower evaporator section 22. The cooling source/second heat transfer media 30 is located around the upper condensing section 26.

Fins 36 may be provided on an outside surface 38 of the midway hybrid evaporator/condensing section 24. The fins 36 extend into the thermal storage medium 14. In various embodiments, the thermal storage medium 14, or at least a portion thereof, and/or the fins 36 are enclosed in chambers 40. The chambers 40 may be hermetically sealed in various embodiments. Fins 42 may also be also be provided on an outside surface 44 of the lower evaporator section 22 and fins 46 may be provided on an outside surface 48 of the upper condensing section 26.

Figure 2:
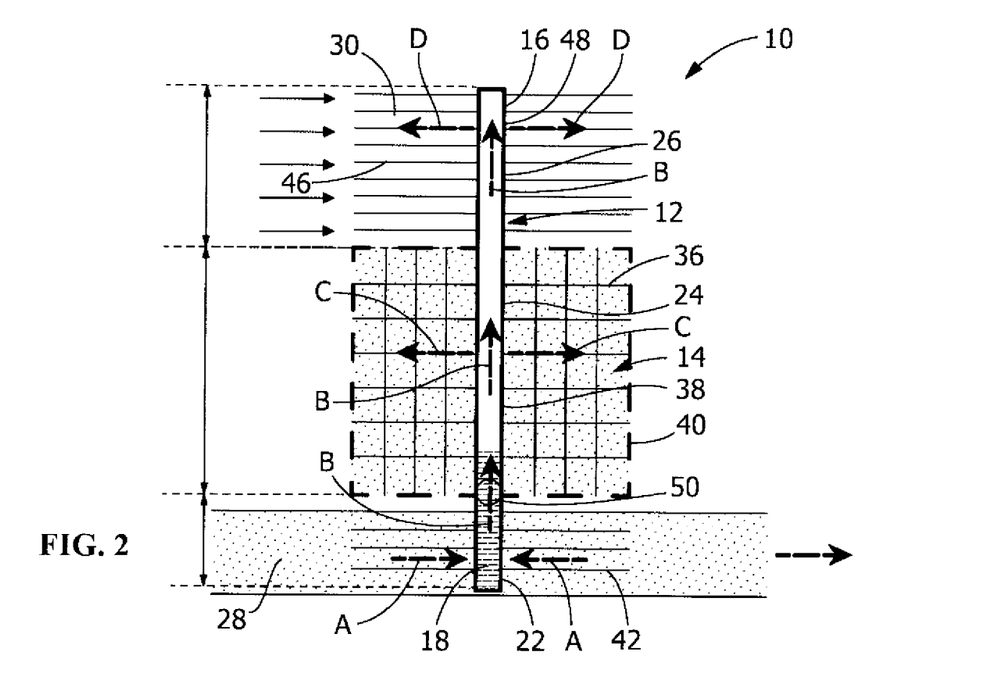
FIG. 2 is a schematic view of the heat pipe-thermal storage medium based cool storage system of FIG. 1, illustrating the utilization mode when the temperature of the heat transfer fluid is warmer than desired, such that the internal valve is open and heat pipes transport heat from a heat transfer fluid 1 in the primary evaporator, through fins in the secondary evaporator/condenser section, and store the heat in a thermal storage medium.
Figure 3:
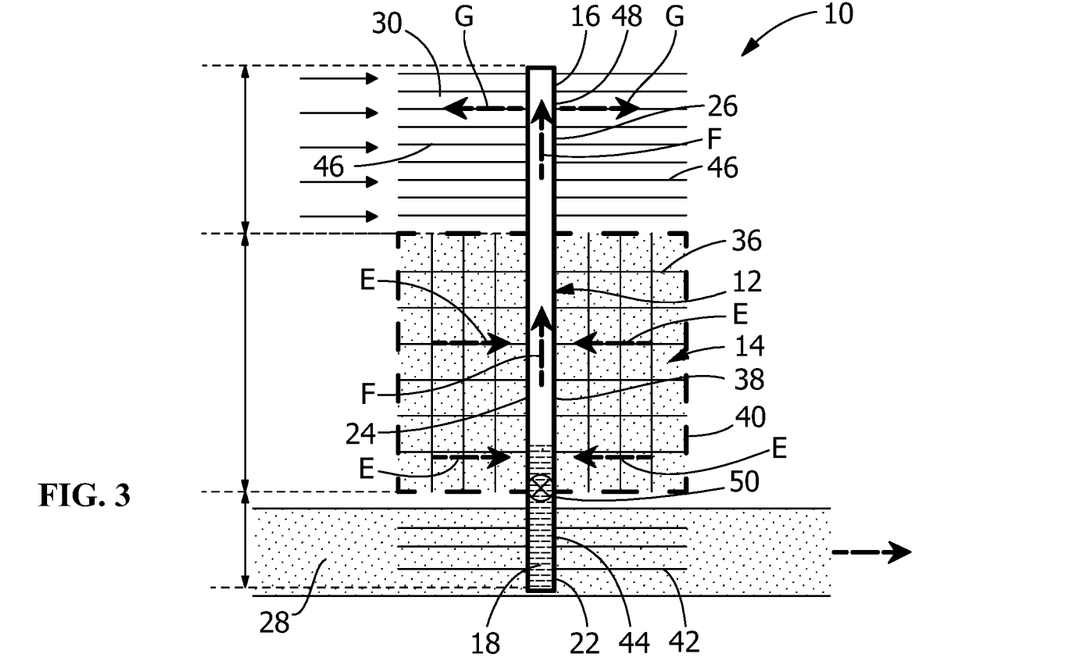
FIG. 3 is a schematic view of the heat pipe-thermal storage medium based cool storage system of FIG. 1, illustrating the regeneration mode, when the heat transfer fluid 2 in the upper primary condenser is cooler than the thermal storage medium and there is no heat exchange between the primary evaporator and the secondary evaporator/condensing section, the secondary evaporator/condensing section serves as an evaporator to vaporize the fluid, and the heat stored in the thermal storage medium will conduct through heat pipe and dissipate through fins in the upper primary condensers to the cooler heat transfer fluid 2.

As shown in FIGS. 1 through 3, the cool storage system 10 of the present invention uses heat pipes 12 to transfer heat from the heat source/first heat transfer media 28 into a thermal storage medium 14 and to the cooling source/second heat transfer media 30, such as ambient air during the daytime (utilization mode). At night, the thermal storage medium 14 serves as the heat source for the hybrid evaporator/condenser section 24, allowing the stored heat to be rejected to the cooling source/second heat transfer media 30, such as ambient air, thus regenerating the thermal storage medium 14 (regeneration mode) such that thermal storage medium 14 can store additional heat during the next cycle. The thermal storage medium 14 may or may not be encapsulated in sealed chambers 40 with internal fin structure 36 to enhance the heat transfer. Both utilization and regeneration modes share the same heat pipes 12 and fin structures 36, 42, 46 for heat transfer. In various embodiments, a heat pipe 12 internal valve 50 is included and provides a thermal break between the thermal storage medium 14 and the heat source/first heat transfer media 28 for preventing heat leak from the heat source/first heat transfer media 28 to the thermal storage medium 14 during the regeneration mode. With a judicious choice of the thermal storage medium 14, the cool storage system 10 can be optimized for different regions and seasonal variations.

The operating principle of the cool storage system 10 is further illustrated in FIGS. 2 and 3. Referring to FIG. 2, during the daytime, ambient temperatures are high, the internal valve 50 will open and the heat pipes 12 will transport the heat from the heat source/first heat transfer media 28 to the lower or primary evaporator section 22, as represented by arrows A. The heat causes the working fluid 18 to vaporize. The resulting vapor pressure drives the vaporized working fluid through the heat pipe 12, as represented by arrows B. A portion of the vaporized working fluid condenses in the secondary hybrid evaporator/condenser section 24, causing heat to be transferred to the thermal storage medium 14 and stored therein through fins 36 of the secondary hybrid evaporator/condenser section 24, as represented by arrows C. In addition, when the cooling source/second heat transfer media 30 in the primary or upper condenser section 26 is cooler than the vaporized working fluid traveling up from primary or lower evaporator section 22 of heat pipe 12, a portion of the vaporized working fluid condenses in the primary or upper condenser section 26, causing the heat to also be transferred up to the upper primary condenser section 26 and dissipated to the cooling source/second heat transfer media 30 in the primary condenser section 26, as represented by arrows D. The heat source/first heat transfer media 28 may be, but is not limited to, a hot gas or a hot liquid or a hot solid or a combination thereof (such as, but not limited to, a liquid-gas mixture). The cooling source/second heat transfer media 30 may be, but is not limited to, a gas or a liquid or a solid or a combination thereof (such as, but not limited to, a liquid-solid mixture).

The thermal storage medium 14 may be, but is not limited to, sensible heat storage material, latent heat storage material or thermo-chemical heat storage material.

Sensible heat storage is storing the thermal energy by the temperature increase or decrease of a storage material. The thermal storage medium 14 may be, but is not limited to, a single-phase material, such as solid metal, sand, liquid water or compressed gas. Most common materials include water, molten salt, sand, rock, concrete and metal.

Latent heat storage is storing the latent heat with a phase change of storage material. The phase change can be between liquid phase, solid phase and gas phase. Most common phase change materials (PCM) include, but are not limited to, liquid-solid organics including paraffin and non-paraffin based phase-change materials, liquid-solid inorganics including salt hydrates and metallic, fatty acid and liquid-solid eutectics compounds including mixtures of organic and inorganics.

Thermo-chemical storage is storing or retrieving heat by reversible exothermic and endothermic reactions. The main principle of thermochemical energy storage is C+heat⇔A+B. In this reaction, thermochemical thermal storage medium C absorbs heat and is converted chemically into components A and B. The reverse reaction occurs when materials A and B reacts to form C with the release of heat. Types of reactions for storage of thermal energy, include, but are not limited to, dehydration, metal hydroxides, and metal oxides. Thermal or chemically reactive materials include, but are not limited to, $MgSO_4.7H_2O$, $FeCO_3$, $Ca(OH)_2$, and $MnO_2$.

The thermal storage medium 14 may be a single material, or a mixture of different thermal storage materials. This includes but not limited to an embodiment in which a set of phase change materials is provided with decreasing melting points adjacent respectively to each of the heat pipes 12 along the flow path of the heat source/first heat transfer media 28. The set of phase change materials maintains a similar temperature drive between each of the thermal storage medium 14 and the heat source/first heat transfer media 28 between each heat pipe-thermal storage medium module during utilization mode.

Referring to FIG. 3, when there is no need for the supplemental cooling of heat source/first heat transfer media 28, the valve 50 will be closed, and there will be no heat exchange between the primary or lower evaporator section 22 and the secondary hybrid evaporator/condensing section 26. During these times, when the cooling source/second heat transfer media 30 in the upper primary condenser section 26 is cooler than the thermal storage medium 14, the secondary hybrid evaporator/condensing section 26 serves as an evaporator to vaporize the fluid, and the heat stored in the thermal storage medium 14 will conduct through heat pipe 12, as represented by arrows E and F, and dissipate through fins 46 in the upper primary condenser section 24 to the cooling source/second heat transfer media 30, as represented by arrows G.

Figure 11:
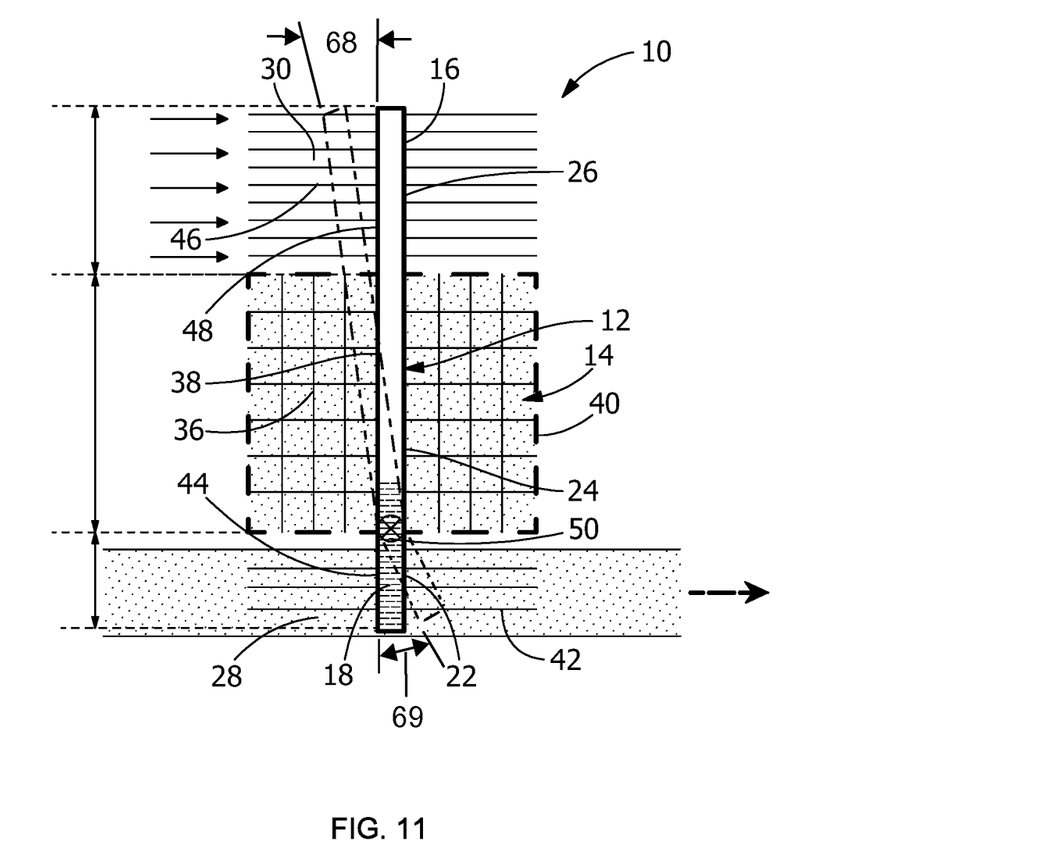
FIG. 11 is a schematic view of an alternate embodiment of the cold storage system.

As shown in FIGS. 1 through 3, the heat pipe(s) 12 are positioned vertically. However, the heat pipe(s) 12 may be positioned at different angles without departing from the invention. Additionally, the tilt angle 68 (FIG. 1) for the lower evaporator section 22, the middle hybrid evaporator/condenser section 24, and the upper condensing section 26 may be the same or may vary between respective sections, such as shown in FIG. 11 with tilt angle 69 for lower evaporator section 22 that is different from tilt angle 68 for the middle hybrid evaporator/condenser section 24, and the upper condensing section 26.

In the illustrative embodiment shown, the valve 50 is located internally in each heat pipe 12 between the lower evaporator section 22 and the middle hybrid evaporator/condenser section 24. The valves 50 open when the heat source/first heat transfer media 28 in the lower evaporator section 22 is warmer than desired, allowing the excess energy from the heat source/first heat transfer media 28 to be transferred by the heat pipe(s) 12 to the thermal storage medium 14, and to the upper condensation section when the cooling source/second heat transfer media 30 in the upper condensing section 26 is cooler than vapor or working fluid 18 in the heat pipe(s) 12. The valves 50 close when the heat source/first heat transfer media 28 in the lower evaporator section 22 is not warmer than desired. A path between the lower evaporator sections 22 and midway hybrid evaporator/condensing sections 26 are partially sealed or completely sealed when the valves 50 are closed. In various embodiments, the valves 50 are passive valves, which close and open in response to the temperature of the heat source/first heat transfer media 28. In other embodiments, the valves 50 are active valves, such as, but not limited to electrically operated valves.

While FIGS. 1 through 3 illustrate the cool storage system 10 with an internal valve 50 located in the heat pipe 12, the invention is no so limited. Other embodiments of the cool storage system 10 may be used without an internal valve.

In operation, when no heat is applied to a standard thermosyphon heat pipe 12, all of the working fluid 18 drains to the bottom of the lower evaporator section 22. Once heat is applied to the lower evaporator section 22 of the thermosyphon heat pipe, the liquid working fluid 18 vaporizes, and then the vapor travels up to the condenser section 26, where it condenses. The liquid drains back down as a liquid film, which gets thicker as it travels down the condenser section 26. The amount of liquid charge is set by the amount of liquid in the draining film. In various embodiments, half of the evaporator section 22 is filled with liquid when the thermosyphon heat pipe is not working.

Figure 4:
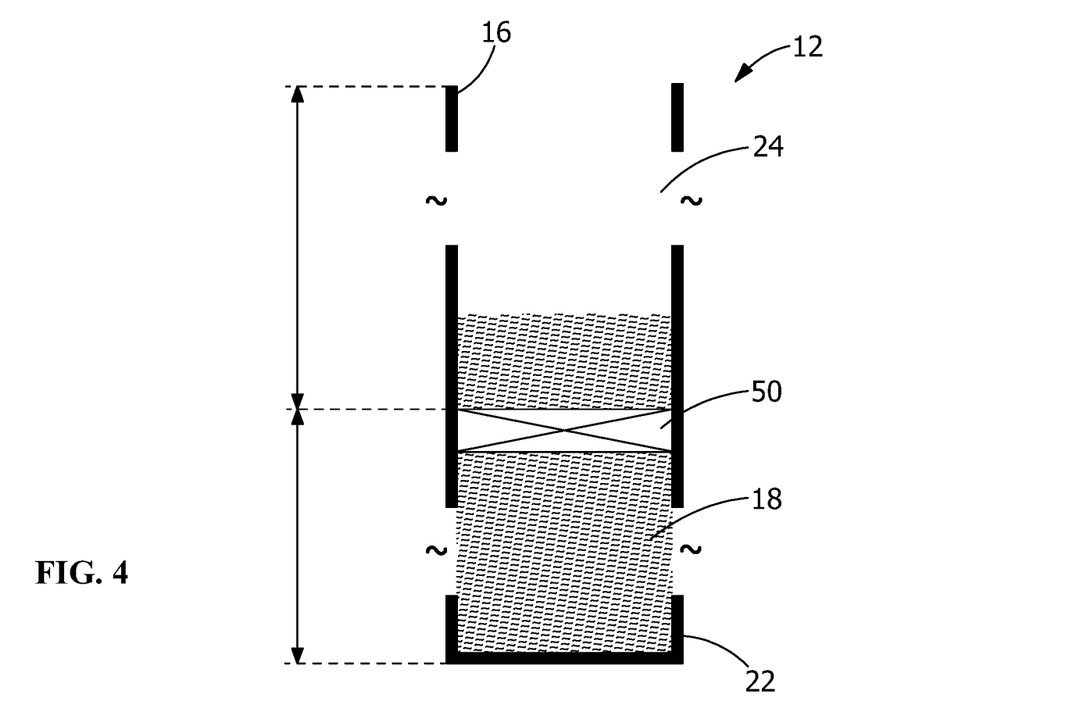
FIG. 4 is an enlarged partial view of the heat pipe of FIG. 1, with overcharged liquid provided therein.

As shown in FIGS. 1 through 3, the cool storage system 10 has both a primary evaporator section 22 and secondary hybrid evaporator section 24. Using a standard thermosyphon, the secondary hybrid evaporator section 24 in the cool storage system 10 could not operate when the primary evaporator 22 is not working. The reason is that all of the wording fluid 18 in the system would drain below the secondary evaporator if the primary evaporator is shut off. In order to overcome this problem and allow the thermosyphon heat pipe to function properly, the working fluid 18 is overcharged, such that the liquid level or liquid pool height of the working fluid 18 is raised high enough so that the liquid pool extends above the lower or primary evaporator section 22 and extends into or covers a portion of the secondary hybrid evaporator/condenser section 24 which is adjacent to the thermal storage medium 14, as shown in FIG. 4. This allows the thermosyphon heat pipe 12 and the secondary hybrid evaporator section 24 to operate when the primary evaporator section 22 is not operating.

However, overfilling the liquid pool can lead to problems during start-up of the primary evaporator section 22. For the primary evaporator section 22 to start-up, vapor bubbles must be generated. As the liquid head increases, the hydrostatic pressure in the primary evaporator section 22 increases. In turn, a higher temperature is required to start the thermosyphon heat pipe 12. This is a known problem for thermosyphon heat pipes in the aerospace industry, where a supplemental heater often needs to be added to allow the thermosyphon to start during ground testing.

This problem can be overcome by storing liquid in the hybrid secondary evaporator/condenser section 24. The goal is to provide enough liquid for the thermosyphon heat pipe 12 to start up when heat is applied only to the secondary evaporator/condenser section 24, while minimally impeding condensation in the cool energy utilization mode.

Figure 5:
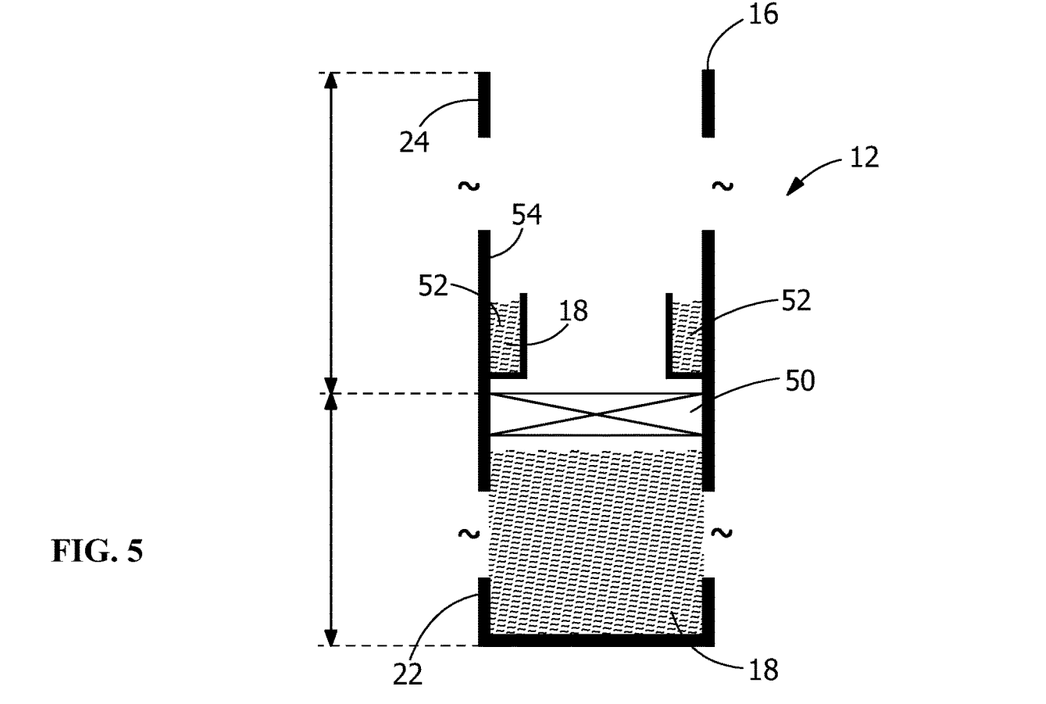
FIG. 5 is an enlarged partial view of a first alternate embodiment of a heat pipe for use with the cool storage system, the heat pipe includes pockets in the hybrid evaporator/condensing section to hold liquid for regeneration of thermal storage medium.

FIG. 5 depicts an illustrative embodiment to store liquid in the secondary hybrid evaporator/secondary condenser section 24. In this embodiment, one or more internal pockets 52 are provided on an internal wall 54 of the secondary hybrid evaporator/secondary condenser section 24 of the heat pipe 12 to hold or retain a designated amount of liquid or working fluid 18 in the hybrid evaporator/condensing section 26. During the cool storage utilization mode, i.e. the valve 50 is open and the working fluid 18 in the primary evaporator section 22 is vaporized and travels to the hybrid evaporator/condenser section 24 and primary condenser section 26, the resulting working fluid condensate falls along the wall 54 of the heat pipe 12. The condensate accumulates first in the pocket 52. Once the pocket 52 is full, the condensate overflows the pocket 52 and circulates back to the lower primary evaporator section 22.

When in the thermal storage medium 14 regeneration mode, the valve 50 is closed and the hybrid evaporator/condensing section 26 serves as the only evaporator. In this mode, the heat stored in the thermal storage medium 14 heats up the reserved working fluid 18 stored in the pocket 52. The working fluid 18 vaporizes and transports the heat to the upper primary condensing section 26. The amount of required working fluid 18 and associated geometry of the pocket 52 in the hybrid evaporator/condensing section 26 is dependent on the specific application and operating conditions. In this illustrative embodiment, the level of working fluid 18 in the pocket 52 is the same as the height of the pocket 52, considering the condensed working fluid 18 flows into the pocket 52 first before circulating back to the primary lower evaporator section 22. This allows the level of working fluid 18 in the primary lower evaporator section 22 to be low, for example below the valve 50 location in various embodiments. Alternatively, the level of working fluid 18 can be high, for example above the valve 50 location in various embodiments. The level of the working fluid 18 is adjusted depending on the amount of total charge desired in the heat pipe 12.

Figure 6:
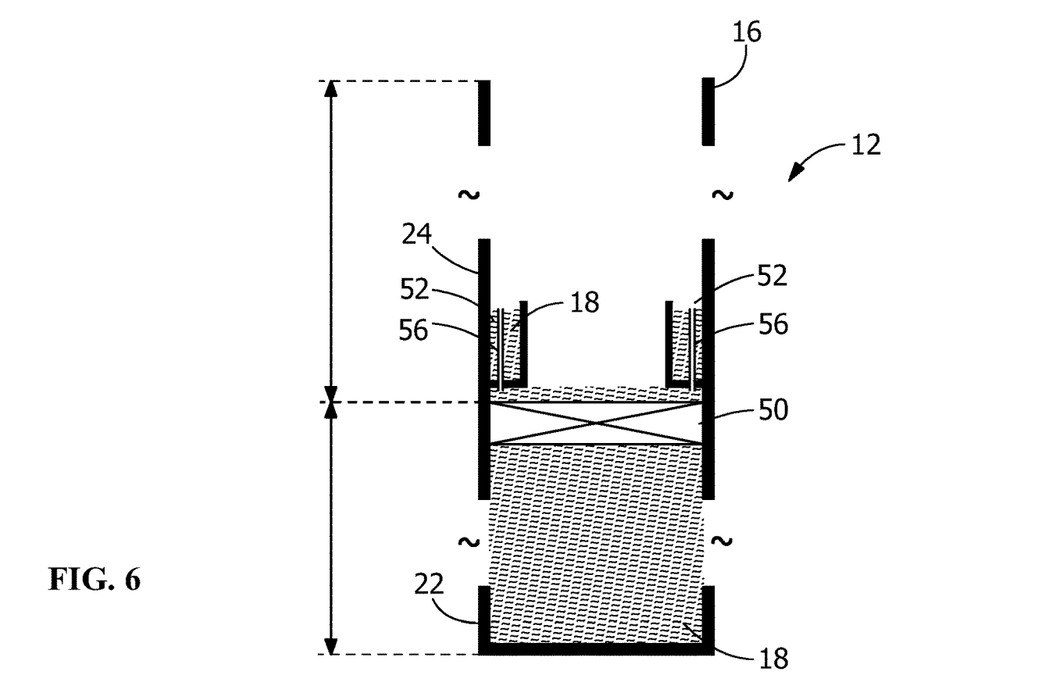
FIG. 6 is an enlarged partial view of a second alternate embodiment of a heat pipe for use with the cool storage system, the heat pipe includes pockets and drainers in the hybrid evaporator/condensing section, to hold liquid for regeneration of thermal storage medium.

Based on the design of the pocket(s) 52 in the hybrid evaporator/condensing section 26, additional features can be further added to control the amount of working fluid 18 held in this section 26. As shown in FIG. 6, in one illustrative embodiment, a drainer (or drainers) 56 are provided in the internal pocket(s) 52. The drainer 56 is a short tube inserted through the bottom plate of the pocket 52. When the condensed working fluid 18 falls back to the pocket 52, the condensate working fluid 18 will accumulate in the pocket 52 until the level of the working fluid 18 reaches the same height of the drainer 56. If the opening of the drainer 56 is very small, the working fluid 18 may keep accumulating until it overflows out of the pocket 52. This allows the approximate amount of the working fluid 18 which remains in the pocket 52 to be further controlled by adjusting the dimensions of the drainer 56, allowing for optimization of the cool storage system 10 according to different heating and cooling requirements.

Figure 7:
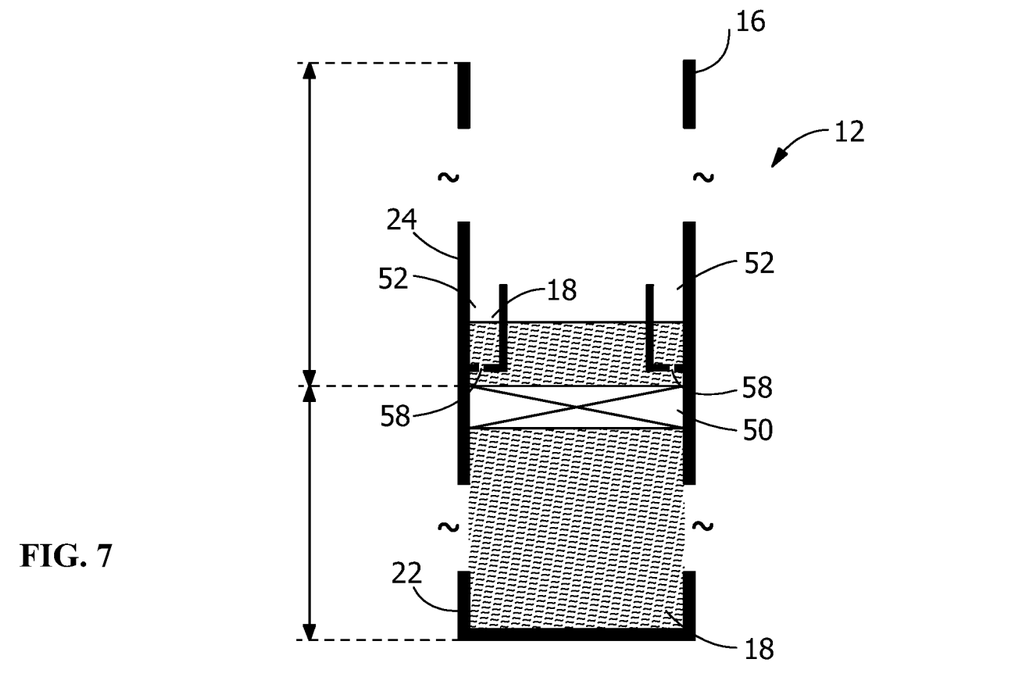
FIG. 7 is an enlarged partial view of a third alternate embodiment of a heat pipe for use with the cool storage system, the heat pipe includes pockets and orifices in the hybrid evaporator/condensing section, to hold liquid for regeneration of thermal storage medium.

Alternatively, the total amount of condensed working fluid 18 in the pocket(s) 52 can be controlled by the incorporation or installation of an orifice (orifices) 58 in the pocket 52, as shown in FIG. 7. The shape and size of the opening of the orifice 58 will determine how fast the working fluid 18 can be drained out of the pocket 52, allowing the total amount of working fluid 18 remaining in the pocket 52 to be determined for specific applications. During the regeneration process, there will always be an amount of working fluid 18 between the bottom of the pocket 52 and the upper level of primary evaporator 22, facilitating the capture the heat out of the thermal storage medium 14 in the same region.

In the embodiment shown in FIGS. 5 through 7, dry-out of the hybrid evaporator/condensing section 26 may occur during the regeneration of the thermal storage medium 14. In order to eliminate this problem, pocket(s) 52 and the associated drainer(s) 56 or orifice(s) 58 are configured to ensure that there is sufficient amount of working fluid 18 reserved at the beginning of regeneration process after the valve 50 is closed. The amount of reserved condensate or working fluid 18 is optimized, as too much working fluid 18 in the region of hybrid evaporator/condensing section 26 would impede the condensation during the utilization of the utilization mode, as mentioned previously.

Figure 8:
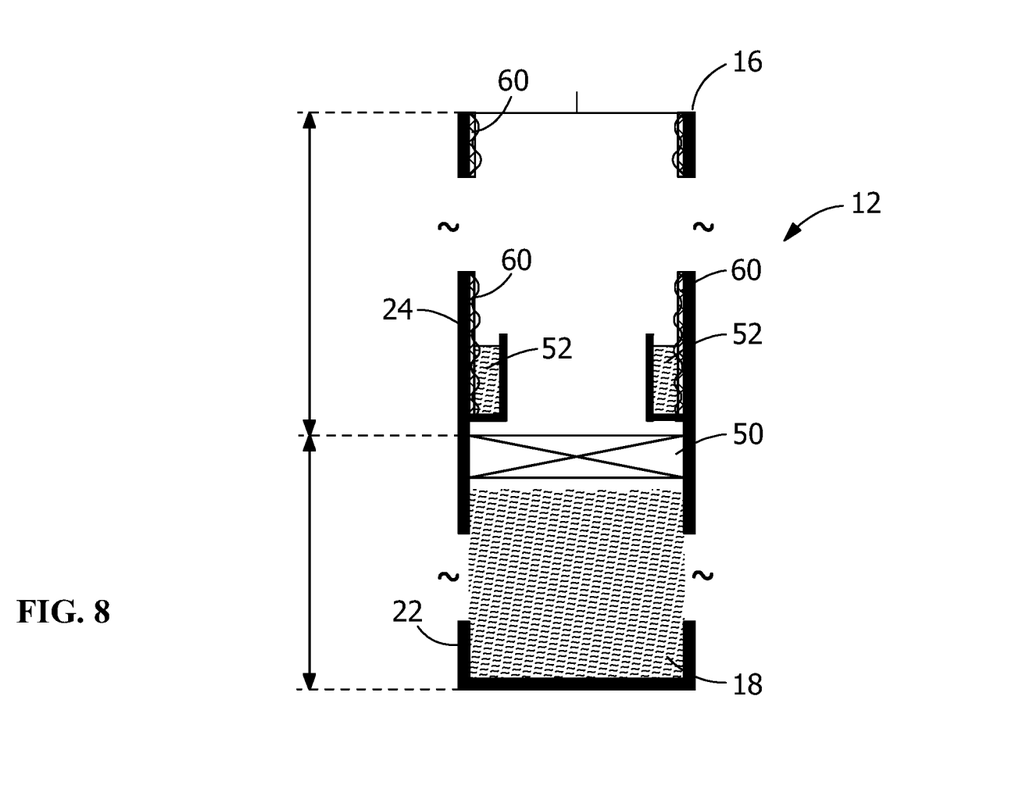
FIG. 8 is an enlarged partial view of a fourth alternate embodiment of a heat pipe for use with the cool storage system, the heat pipe includes pockets and wicks such as screens in the hybrid evaporator/condensing section, to hold liquid for regeneration of thermal storage medium.
Figure 9:
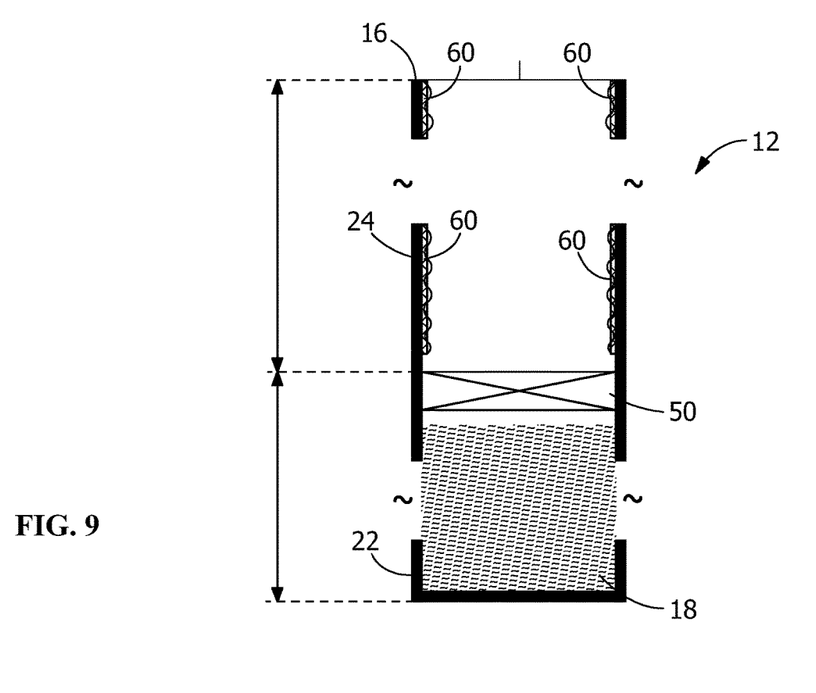
FIG. 9 is an enlarged partial view of a fifth alternate embodiment of a heat pipe for use with the cool storage system, the heat pipe includes wicks such as screens in the hybrid evaporator/condensing section, to hold liquid for regeneration of thermal storage medium.

In addition to the embodiments shown in FIGS. 5 through 7, wick or wick-like structures 60 can be used to retain a certain amount of working fluid 18 for the regeneration process, while maintaining acceptable heat transfer performance. As shown in FIG. 8, wick-like structure 60 (such as, but not limited to, screens) can be used with pocket(s) 52 on the hybrid evaporator/condenser section 24 to retain condensate or working fluid 18. Alternatively, as shown in FIG. 9, wick-like structure 60 may be used without pocket(s) 52. In either of the case, the wick-like structure 60 can be one piece, or the wick-like structure 60 can consist of several smaller pieces at given locations in the hybrid evaporator/condensing section 26.

Figure 10:
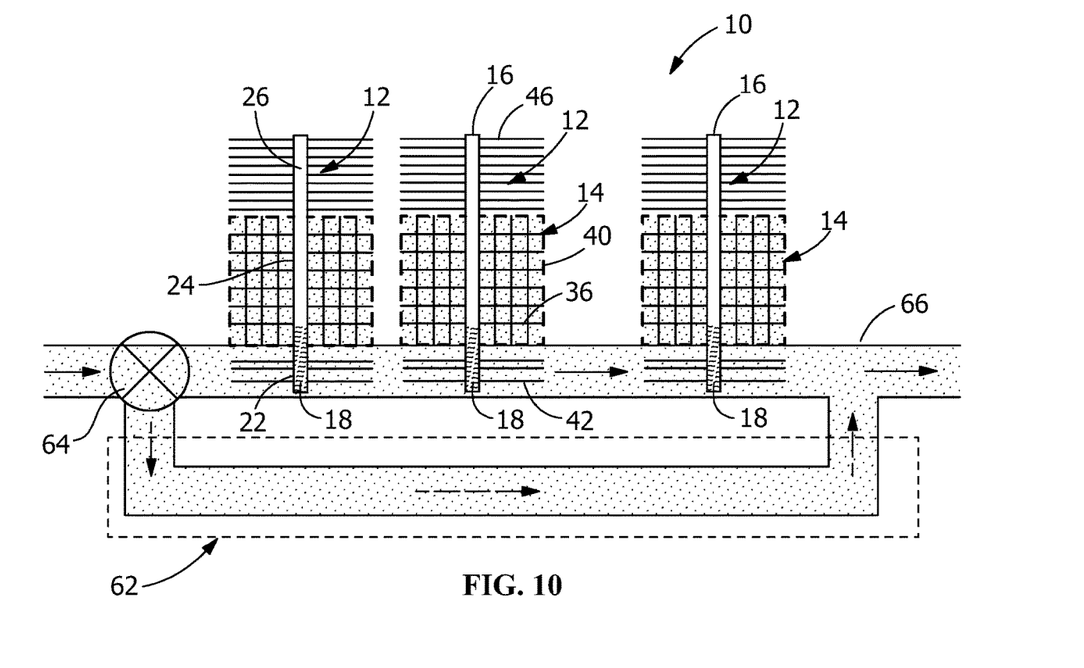
FIG. 10 is a schematic view of an alternate embodiment of the cold storage system with a bypass.

While FIGS. 1 through 9 show a cool storage system 10 which includes one or more heat pipe 12 with thermal storage medium 14 units, in which the thermal break is created individually for each of the heat pipe 12 using a valve 50 when the cooling is not needed or during the period of regeneration of the thermal storage medium 14, this system can also work without the heat pipe valves, by using a bypass loop 62. As shown in FIG. 10, the bypass loop 62 allows the cool storage system 10 to be cut off from the upstream flow of the heat source/first heat transfer media 28 to create a thermal break. During the cold energy utilization process, a bypass three-way valve 64 is closed, allowing the heat source/first heat transfer media 28 to flow across the lower evaporator sections 22 of the heat pipes 12 of the cool storage system 10. When the heat source/first heat transfer media 28 does not need additional cooling, or to regenerate the thermal storage medium 14, the bypass valve 64 is opened, and the heat source/first heat transfer media 28 flows through the bypass loop 62 and does not contact the lower evaporator sections 22 of the heat pipes 12. The valve 64 can be controlled to allow a portion of heat source/first heat transfer media 28 to flow across the lower evaporator sections 22 of the heat pipes 12 of the cool storage system 10, while the balance of the heat source/first heat transfer media 28 flows through the bypass loop 62. The two streams recombine at the exit of the cool storage system. The ability to partially or fully bypass the heat pipe 12(s) can be beneficial during the regeneration of the thermal storage medium 14. This is also useful for the cool storage system 10 utilization process, when a certain temperature or pressure of the heat source/first heat transfer media 28 is required at the exit before it flows to the next unit.

While the illustrative embodiments have been described with respect to a dry cooling system, other applications are envisioned. For example, the cool storage system 10 can be used in building chiller plants.

As described, with the used of the cool storage system 10, heat pipes 12 help spread the heat load and fins provide for additional heat transfer area. The excess heat from the power plant can be efficiently transferred to the cool storage media, and then dissipated to a cooler ambient at night. Through design and optimization, the amount of required structure and fan power for heat transport can be minimized and the system can be cost-effective. As an example, based on the cost and performance analysis of a 550 MW power plant model with 318 MW required cooling, the number of Air-Cooled Condenser (ACC) cells can reduce from 80 cells to 60 cells when coupled with the cool storage system 10.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A cool storage system comprising:
a plurality of heat pipes, each of the heat pipes having a primary evaporator section, a secondary hybrid evaporator/condensing section, and a primary condensing section vertically separated from the primary evaporator section, the secondary hybrid evaporator/condensing section vertically positioned between the primary evaporator section and the primary condensing section, each of the heat pipes containing a selected amount of a heat transfer fluid adapted to transfer heat from the primary evaporator section to the secondary hybrid evaporator/condensing section and the primary condensing section through a vapor/condensation cycle, or the heat transfer fluid being adapted to be vaporized in the secondary hybrid evaporator/condensing section and condensed in the primary condensing section;
a thermal storage medium in thermal engagement with the secondary hybrid evaporator/condensing section;
a heat source located in or around said primary evaporator section;
a cooling source located in or around said primary condensing section; and
at least one of the heat pipes having a valve located between the primary evaporator section and the secondary hybrid evaporator/condensing section, the valve completely sealing a path between the primary evaporator section and the secondary hybrid evaporator/condensing section when the valve is closed.

2. The cool storage system as recited in claim 1, wherein fins are provided on an outside surface of the secondary hybrid evaporator/condensing section, and extended into the thermal storage medium.

3. The cool storage system as recited in claim 2, wherein the thermal storage medium and fins are enclosed in chambers.

4. The cool storage system as recited in claim 1, wherein fins are provided on an outside surface of the primary evaporator section and the primary condensing section.

5. The cool storage system as recited in claim 1, wherein the thermal storage medium is a single-phase material, such as solid metal, sand, liquid water, or compressed gas, which acts as a sensible heat storage medium.

6. The cool storage system as recited in claim 1, wherein the thermal storage medium is a phase-change material, such as liquid-solid organics including paraffin and non-paraffin based phase-change materials, liquid-solid inorganics including salt hydrates and metallic, liquid-solid eutectics including mixtures of organic and inorganics.

7. The cool storage system as recited in claim 1, wherein the thermal storage medium is a chemically reactive material, such as an adsorbent, which releases heat during adhesion of a substance to its surface, and stores heat in the reverse process.

8. The cool storage system as recited in claim 1, wherein the thermal storage medium is a mixture of different thermal storage materials.

9. The cool storage system as recited in claim 1, wherein at least a portion of the thermal storage medium is enclosed in chambers.

10. The cool storage system as recited in claim 9, wherein the chambers are hermetically sealed.

11. The cool storage system as recited in claim 1, wherein the secondary hybrid evaporator/condensing section of at least one of the heat pipes has overcharged liquid which extends above the primary evaporator section.

12. The cool storage system as recited in claim 1, wherein the secondary hybrid evaporator/condensing section of at least one of the heat pipes has one or more internal pockets to retain liquid in the secondary hybrid evaporator/condensing section.

13. The cool storage system as recited in claim 12, wherein the secondary hybrid evaporator/condensing section of at least one heat pipe has drainers in the internal pockets.

14. The cool storage system as recited in claim 12, wherein the secondary hybrid evaporator/condensing section of at least one heat pipe has orifices in the internal pockets.

15. The cool storage system as recited in claim 1, wherein the secondary hybrid evaporator/condensing section of at least one heat pipe has screens to retain liquid.

16. The cool storage system as recited in claim 1, wherein the heat source located in the primary evaporator section is a hot gas or a hot liquid or a hot solid or a combination thereof.

17. The cool storage system as recited in claim 1, wherein the cooling source located in the primary condensing section is a gas or a liquid or a solid or a combination thereof.

18. The cool storage system as recited in claim 1, wherein the heat pipes have a tilt angle for the primary evaporator section and/or the secondary hybrid evaporator/condensing section, and/or the upper condensing section.

19. The cool storage system as recited in claim 1, wherein the valve is located internally between the primary evaporator section and the secondary hybrid evaporator/condensing section.

20. The cool storage system as recited in claim 19, wherein the valve opens when the heat source in the primary evaporator section is warmer than desired, allowing the excess energy from the heat source to be transferred by the heat pipe to the thermal storage medium, and to the primary condensation section when the cooling source in the primary condensing section is cooler than vapor in the heat pipe.

21. The cool storage system as recited in claim 19, wherein the valve closes when the heat source in the primary evaporator section is not warmer than desired.

22. The cool storage system as recited in claim 21, wherein a path between the primary evaporator section and secondary hybrid evaporator/condensing section is partially sealed or completely sealed when the valve is closed.

23. The cool storage system as recited in claim 19, wherein the valve closes and opens in response to the temperature of the heat source.

24. The cool storage system as recited in claim 19, wherein the valve is an electrically operated valve.

25. The cool storage system as recited in claim 1, wherein at least one of the heat pipes is a thermosyphon, wherein during operation, a liquid pool height in the at least one of the heat pipes extends into the secondary hybrid evaporator/condensing section which is adjacent to the thermal storage medium, to allow the thermosyphon to operate when a primary evaporator is not operating.

26. The cool storage system as recited in claim 1, wherein a bypass loop is provided to allow the heat source to partially or fully bypass the plurality of heat pipes during a regeneration of the thermal storage medium.

27. The cool storage system as recited in claim 18, wherein the tilt angle for at least one section of the primary evaporator section and/or the secondary hybrid evaporator/condensing section, and/or the primary condensing section is different than the tilt angle of a remaining section of the primary evaporator section and/or the secondary hybrid evaporator/condensing section, and/or the primary condensing section.

* * * * *

UNITED STATES PATENT AND TRADEMARK OFFICE
CERTIFICATE OF CORRECTION

| | |
|---|---|
| PATENT NO. | : 10,605,541 B1 |
| APPLICATION NO. | : 15/270083 |
| DATED | : March 31, 2020 |
| INVENTOR(S) | : Ying Zheng et al. |

It is certified that error appears in the above-identified patent and that said Letters Patent is hereby corrected as shown below:

In the Specification

Column 1, Line 10 include U.S. government support clause to read as:
"This invention was made with Government support under Contract number DE-AR0000582, awarded by the Advanced Research Projects Agency-Energy of the Department of Energy. The Government has certain rights in the invention".

Signed and Sealed this
Third Day of December, 2024

Katherine Kelly Vidal
*Director of the United States Patent and Trademark Office*